United States Patent Office 3,509,192
Patented Apr. 28, 1970

3,509,192
METHOD OF PREPARING BRANCHED METHYL POLYSILOXANE - POLYGLYCOL ETHER CONDENSATES AND PRODUCTS THEREOF
Hans Niederprüm, Monheim, and Walter Simmler, Odenthal-Schlinghofen, Germany, assignors to Farbenfabriken Bayer Aktiengesellschaft, Leverkusen, Germany, a corporation of Germany
No Drawing. Filed Mar. 25, 1966, Ser. No. 537,273
Claims priority, application Germany, Apr. 9, 1965,
F 45,777
Int. Cl. C07f 7/04, 7/18
U.S. Cl. 260—448.8    3 Claims

ABSTRACT OF THE DISCLOSURE

Branched methyl polysiloxane-polyglycol ether condensates useful as pore regulators in polyrethane foam production are prepared by reacting a mono-chloro end-blocked branched methyl polysiloxane with ammonia in an inert water immiscible solvent and reacting the intermediate product obtained with a polyglycol monoalkyl ether.

---

This invention relates to branched methyl polysiloxane-polyglycol ether condensates, and is especially concerned with the production of compounds of the formula

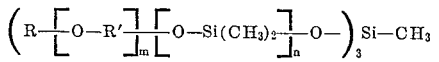

wherein R is methyl, ethyl or, preferably, n-butyl, and $\{O\text{---}R'\}_m$ is an oxyalkylene chain containing, on the average, 17 to 19 oxyethylene radicals and 15 to 17 oxypropylene radicals; the number $n$ has a mean value of 5 to 7.

These branched methyl polysiloxanes which are modified by polyglycol ether have proved to be excellent stabilizers and pore regulators in the production of polyurethane foams and can be used in the well known manner which has hitherto been customery for analogous additives intended for the same purpose.

Polyether-polysiloxane compounds of a structure analogous to that of the above formula have hitherto been obtainable by two methods, viz. (a) by transesterification of alkoxy-siloxanes with monoalkyl polyglycol ethers, and (b) by condensation of these polyethers with siloxanehydrides. Method $a$ requires expensive and toxic fluorinated carboxylic acids as catalysts; and method $b$ necessitates the use of catalysts so highly active (e.g. alkali metal alcoholates, acids, Friedel-Crafts catalysts) that the structure of the compounds is impaired by splitting of the siloxane bonds and rearrangement. Moreover, methyl polysiloxanes having terminal dimethyl hydrogen siloxane units can be obtained only with difficulty. On the other hand, the transesterification, especially of the more reactive alkoxysiloxanes having lower alkoxyl radicals which are highly sensitive to hydrolysis in an acidic medium, requires not only extremely anhydrous solvents but also equally anhydrous polyglycol ethers, since even a slight hydrolysis in the ensuing siloxane condensation leads to considerable chain lengthening in the polysiloxane and to a disproportion between mono- and trifunctional siloxane units. The removal of traces of water from the hydrophilic polyglycol ethers is very troublesome. Furthermore, both methods are characterized in that they require long reaction times at elevated temperatures to achieve satisfactory yields, so that also the thermally sensitive polyglycol ethers are modified by decomposition reactions.

For the intended application mentioned above, i.e. the production of polyurethane foams, an additive structure which is precisely adjusted to the reaction mixture to be converted into foam is the essential prerequisite for achieving the optimum effect, and its constancy and reproducibility in the production are therefore essential. A two-stage process of production has now been found by which the disadvantages described above can be obviated in an economically advantageous manner and the products defined above, which are very suitable for the aforesaid purpose, are reliably obtained.

According to the present invention a method of preparing these compounds comprises gradually adding a methyl-tris[ω-(dimethyl-chlorosiloxy) - poly - (dimethylsiloxy)]-silane of the formula

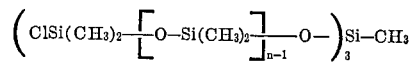

at room temperature, with intense mixing, to a solution of excess ammonia or methyl-, ethyl- or propyl-amine in an inert water-immiscible solvent, completely separating off the chloride thus formed, mixing the intermediate product so obtained at room temperature with a solution of a polyglycol monoalkyl ether of the formula

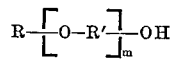

in an inert diluent, and heating the mixture to boiling temperature such that this temperature is reached only after at least 2 hours. The symbols $n$, R and

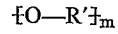

have the meanings specified above. Suitable inert solvents and diluents are benzene, toluene and xylene.

It is known to react chlorosilicon compounds with ammonia or alkylamines to form aminosilicon compounds, and also to react the latter with alcohols to form alkoxysilicon compounds; however, it is also known that, in analogy with the siloxane condensation of silanols, the aminosilicon compounds spontaneously condense to form silazanes. For this reason, the methods of preparation according to the known teaching, especially when carried over to branched polysiloxanes, do not give a yield and degree of purity which would suffice for industrial production. If, for example, ammonia is introduced into a solution of a trichloro-polymethyl siloxane of the above structure, a gel-like insoluble cross-linking product, in which the Si—NH—Si groups can be detected by infrared spectroscopy, is precipitated, in addition to ammonium chloride. Surprisingly, it is now possible, by providing, according to the invention, for a sufficient excess of base at any time and at any place in the reaction mixture, by completely separating the chloride, washing it out with water, if necessary, and then immediately removing also the water, to suppress the silazane condensation to such an extent that a clear solution of aminopolysiloxane is obtained, which is free from chlorine and suitable for further reaction. In the case of alkylamino compounds, it is even possible to isolate the intermediate product of the process from its solution in high yield in the form of an oil of low viscosity.

It is further known that the reaction of aminosilicon compounds with alcohols in an alkaline medium proceeds only slowly and requires acidic catalysts, e.g. an ammonium salt. When an attempt is made to carry over this teaching to the present task, by reacting a triamino-polymethyl siloxane prepared in the manner described above with a polyglycol monoalkyl ether in the presence of small amounts of ammonium sulphate, then a gel is again obtained. In this case, obviously, the ammonium salt accelerates the undesired formation of silazane by two amino groups to a greater extent than it accelerates the reaction between the amino and hydroxyl compounds.

The process according to the invention, therefore, carefully avoids the presence of ammonium salt; in the case of unsubstituted ammonium chloride it is not sufficient for this purpose to filter off the salt precipitated in the first reaction step, it is necessary to wash this salt out with water. However, if an attempt is then made to carry out the reaction of the second step by heating without special measures, an insoluble gel is again rapidly formed as the product of silazane cross-linking.

By contrast, treatment of the reaction mixture according to the invention yields almost exclusively a solution of the desired Si—O—C compound. Small proportions of insoluble by-products can be removed by filtration. After evaporation of the solvent, there remains in every case a completely homogeneous viscous oil producing clear solutions in water.

In contrast to the known transesterification process, the cross-linking reaction mentioned above has here the advantageous effect that no residues of unesterified polysiloxane remain in the product. Such polysiloxanes have a very disturbing effect when the products are used as auxiliaries for the production of polyurethane foam, as mentioned above. Their formation may be due to a certain inaccuracy in the determination of the equivalent weights of the starting materials resulting in an unintentional excess of siloxane in the reaction mixtures. It is, therefore, recommended to use a small precautionary excess of polyglycol ether which ultimately remains dissolved in the final product and, according to experience, is not detrimental to the said intended application.

The following examples are given for the purpose of illustrating the invention.

EXAMPLE 1

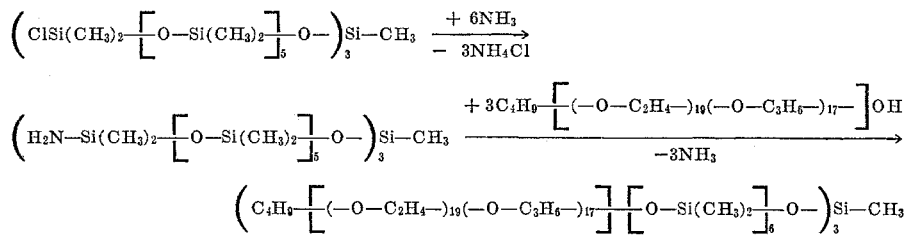

One litre toluene is saturated with gaseous ammonia with the exclusion of aqueous moisture, and to this solution are added, with the continuous introduction of ammonia and with vigorous stirring, over a period of 2 hours, 750 g. (0.5 mol) of a polysiloxane which contains 7.1 percent by weight chlorine and consists, on the average, of one siloxane unit of the formula $Si(CH_3)O_{3/2}$, 15 units of the formula $Si(CH_3)_2O$ and 3 units of the formula $ClSi(CH_3)_2O_{1/2}$. The precipitated ammonium chloride and the residual ammonia are then extracted from the reaction mixture with 1 litre water, and the separated toluene solution is filtered through a layer of anhydrous sodium sulphate. To the filtrate is added, with stirring, a solution, in 4.5 litres toluene, of 3120 g. (1.65 mols, 10% excess) of a poly-(ethylene glycol-propylene glycol)-mono-n-butyl ether in which the ratio by weight of ethylene oxide to propylene oxide is 9:11, the hydroxyl content is 0.9 percent by weight, and the molecular weight is approximately 1890. The mixture is stirred at room temperature for one hour, then gradually heated to boiling temperature over a period of about 2 hours, and boiled for a further hour. During this operation, ammonia continuously escapes. The slightly turbid solution is then filtered and the clear filtrate is evaporated under reduced pressure until it has reached a temperature of 120° C. at 2 mm. Hg. There remain 3450 g. (about 91% of theory) of a completely homogeneous, slightly yellowish oil. At 20° C. its density amounts to 1.045 g./cc., its refractive index, $n_D^{20}$, to 1.4495 and its viscosity to 1076 cp. The product contains 7.3% by weight silicon (calculated 7.5%) and less than 0.1% by weight nitrogen.

EXAMPLE 2

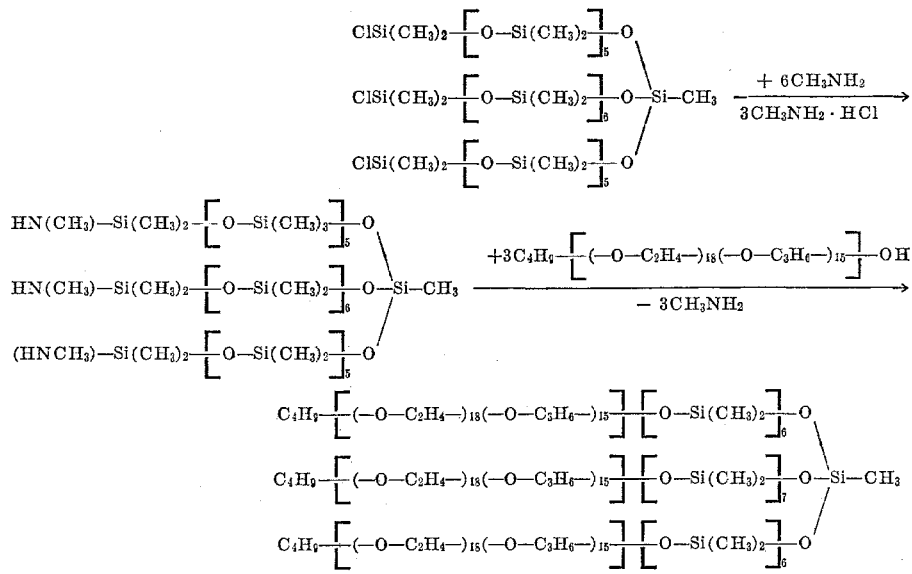

Two litres benzene are saturated with gaseous methylamine and 1565 g. (1 mol) of a polysiloxane which contains 6.8 percent by weight chlorine and consists, on the average, of one siloxane unit of the formula $Si(CH_3)O_{3/2}$, 16 units of the formula $Si(CH_3)_2O$ and 3 units of the formula $ClSi(CH_3)_2O_{1/2}$, are dropped dropwise to this solution over a period of 2 hours with the continuous introduction of methylamine. The precipitated salt is then filtered off and the filtrate rinsed with some benzene. The solvent is evaporated from the combined filtrates under reduced pressure and the residue is finally heated up to 80° C., at 2 mm. Hg. There remain 1370 g. (89% of the theoretical amount) of a colorless oil which has a refractive index $n_D^{20}=1.4088$, a viscosity of 19.3 cp. at 20° C., and a nitrogen content of 2.7% by weight which is in accordance with the theory. The infra-red spectrum shows only bands corresponding to the Si—NH—CH₃ group, but none of the Si—N—Si grouping.

550 grams (0.354 mol) of this intermediate product are mixed with a solution, in 3 litres anhydrous toluene, of 2000 g. (1.178 mols, about 10% excess) of a poly-(ethylene glycol-propylene glycol)-mono-n-butyl ether, in which the ratio by weight of ethylene oxide to propylene oxide is 12:13, the hydroxyl content is 1.0 percent by weight, and the molecular weight, on the average, is 1700. The mixture is stirred at room temperature for one hour, then gradually heated to boiling temperature over a period of about 2 hours, and boiled for a further hour.

During this operation, methylamine gas is continuously evolved, while the initially turbid solution becomes clearer until it is completely homogeneous at 50° C. The solution is evaporated, without filtration, under reduced pressure until the residue has reached a temperature of 120° C. at 2 mm. Hg. There remain 2440 g. (about 97% theoretical) of a clear, slightly yellowish, water-soluble oil, having at 20° C. a density of 1.02 g./cc., a refractive index $n_D^{20}=1.4499$, and a viscosity of 765 cp. The product contains 7.2% by weight silicon (calculated 7.9%) and less than 0.1% by weight nitrogen.

What we claim is:

1. A method of preparing a branched methyl polysiloxane-polyglycol ether condensate of the formula.

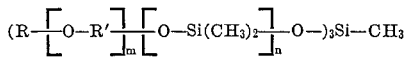

wherein $n$ has a mean value of from 5 to about 7, R is a member selected from the group consisting of methyl, ethyl and n-butyl and $\{O—R'\}_m$ is an oxylalkylene chain containing an average of 17 to 19 oxyethylene groups and 15 to 17 oxypropylene groups which comprises in a first step gradually adding a compound of the formula

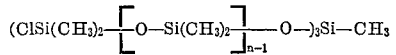

wherein $n$ is as above defined at room temperature under intense stirring to a solution of excess ammonia in an inert water-immiscible solvent, completely separating off the chloride thereby formed, thereafter in a second step mixing and reacting the intermediate product obtained from said first step at room temperature with a solution of a polyglycol monoalkyl ether of the formula

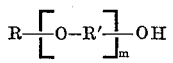

wherein R and $\{O—R'\}_m$ are as above defined in an inert diluent and heating the mixture to boiling temperature and regulating said heating so that this temperature is reached only after at least two hours.

2. A method according to claim 1 wherein the ammonium chloride and residual ammonia present at the completion of said first step are extracted from the reaction mixture with water.

3. A branched methyl polysiloxane-polyglycol ether condensate produced by the process of claim 1.

References Cited

UNITED STATES PATENTS

| | | | |
|---|---|---|---|
| 2,834,748 | 5/1958 | Bailey et al. | 260—448.8 X |
| 2,839,558 | 6/1958 | Kirkpatrick et al. | 260—448.8 |
| 2,846,458 | 8/1958 | Haluska | 260—448.8 X |

OTHER REFERENCES

Bazant et al., "Organosilicon Compounds," vol. I, Academic Press, N.Y. (1965), pps. 77–81 and 85–87.

Andrianov et al., Chemical Abstracts, 52, p. 11734 (1958).

Bazant et al., "Organosilicon Compounds," vol. I, Academic Press, N.Y. (1965), p. 412.

TOBIAS E. LEVOW, Primary Examiner

R. F. SHAVER, Assistant Examiner

U.S. Cl. X.R.

260—2.5

UNITED STATES PATENT OFFICE

Certificate of Correction

Patent No. 3,509,192  April 28, 1970

Hans Niederprum et al.

It is certified that error appears in the above-identified patent and that said Letters Patent are hereby corrected as shown below.

Column 4, Example 2 (Spec. p. 8),

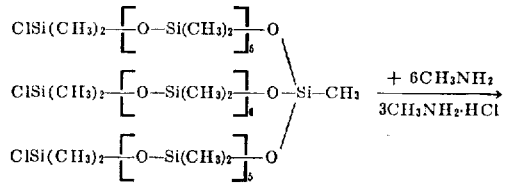

Should be:

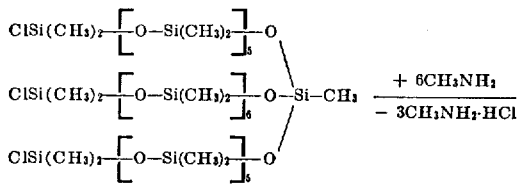

and

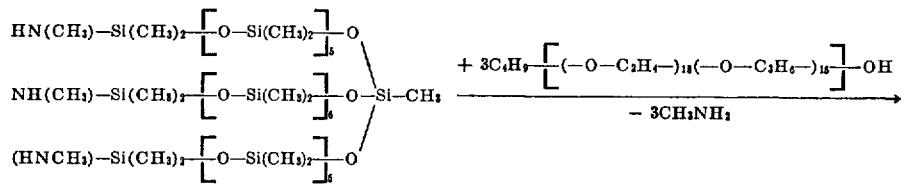

Should be:

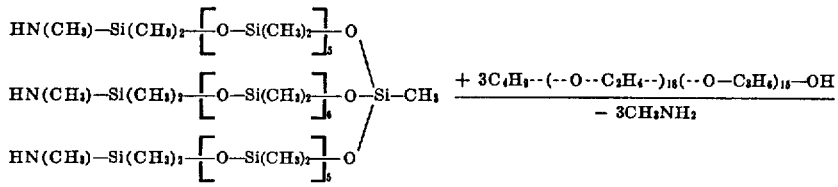

Line 57 (Spec. p. 9, line 1), "dropped" should be —added—.

Signed and sealed this 10th day of November 1970.

[SEAL]

Attest:

EDWARD M. FLETCHER, JR.,
*Attesting Officer.*

WILLIAM E. SCHUYLER, JR.,
*Commissioner of Patents.*